US010297103B2

(12) United States Patent
Hornik et al.

(10) Patent No.: US 10,297,103 B2
(45) Date of Patent: May 21, 2019

(54) GAMING MACHINE INCLUDING A MULTI-MATRIX MODIFIER SYMBOL

(71) Applicant: BALLY GAMING, INC., Las Vegas, NV (US)

(72) Inventors: Jeremy Hornik, Chicago, IL (US); Allon Englman, Chicago, IL (US); Nicholas Poole, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 522 days.

(21) Appl. No.: 14/808,749

(22) Filed: Jul. 24, 2015

(65) Prior Publication Data

US 2017/0024956 A1 Jan. 26, 2017

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/32*** | (2006.01) |
| ***G07F 17/34*** | (2006.01) |

(52) U.S. Cl.

CPC .......... *G07F 17/3213* (2013.01); *G07F 17/34* (2013.01)

(58) Field of Classification Search

USPC .................................. 463/20, 21, 22, 25, 27

See application file for complete search history.

(56) References Cited

U.S. PATENT DOCUMENTS

| | | | |
|---|---|---|---|
| 8,043,155 B2 | 10/2011 | Singer et al. | |
| 8,469,797 B2 | 6/2013 | Collette et al. | |
| 8,512,127 B2 | 8/2013 | Jaffe et al. | |
| 8,622,809 B1 * | 1/2014 | Arora | G07F 17/3258 463/20 |
| 2008/0108411 A1 * | 5/2008 | Jensen | G07F 17/32 463/20 |
| 2008/0146319 A1 * | 6/2008 | Yoshizawa | G07F 17/3265 463/21 |
| 2013/0324213 A1 | 12/2013 | Aoki et al. | |
| 2014/0087830 A1 * | 3/2014 | Gobe | G07F 17/3213 463/20 |
| 2014/0194184 A1 | 7/2014 | Lange et al. | |
| 2014/0274288 A1 | 9/2014 | Hornik et al. | |
| 2015/0011291 A1 | 1/2015 | Nauman | |

* cited by examiner

*Primary Examiner* — Adetokunbo O Torimiro

(74) *Attorney, Agent, or Firm* — Marvin A. Hein

(57) ABSTRACT

Disclosed is a gaming system including a regulated gaming machine primarily dedicated for use in playing at least one regulated casino wagering game that randomly selects an outcome of the casino wagering game and displays the selected outcome via first and second adjoining matrices comprising a plurality of game symbols and at least one modifier symbol displayed in a position to temporarily overlay at least one symbol in each of the first and second matrices and to convert any overlaid symbols to another symbol prior to awarding an award in response to the displayed outcome meeting a predetermined award criterion.

22 Claims, 12 Drawing Sheets

GAMING MACHINE INCLUDING A MULTI-MATRIX MODIFIER SYMBOL

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, systems, apparatus, and methods and, more particularly, to gaming machines, systems, apparatus, and methods including overlaying modifier symbols.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

SUMMARY OF THE INVENTION

According to one aspect of the present invention, a gaming system includes a regulated gaming machine primarily dedicated for use in playing at least one regulated casino wagering game. The gaming machine includes an electronic display device and a value input device. The gaming machine also includes game-logic circuitry configured to detect, via the value input device, a physical item associated with a monetary value that establishes a credit balance, to receive an input indicative of a wager covered by the credit balance, to randomly select an outcome of the casino wagering game and to direct the electronic display device to display the selected outcome via first and second adjoining matrices comprising a plurality of game symbols and a modifier symbol displayed in a position to temporarily overlay at least one symbol in each of the first and second matrices and to convert any overlaid symbols to another symbol; and to award an award in response to the displayed outcome meeting a predetermined award criterion.

Additional aspects of the invention will be apparent to those of ordinary skill in the art in view of the detailed description of various embodiments, which is made with reference to the drawings, a brief description of which is provided below.

Figure 1:
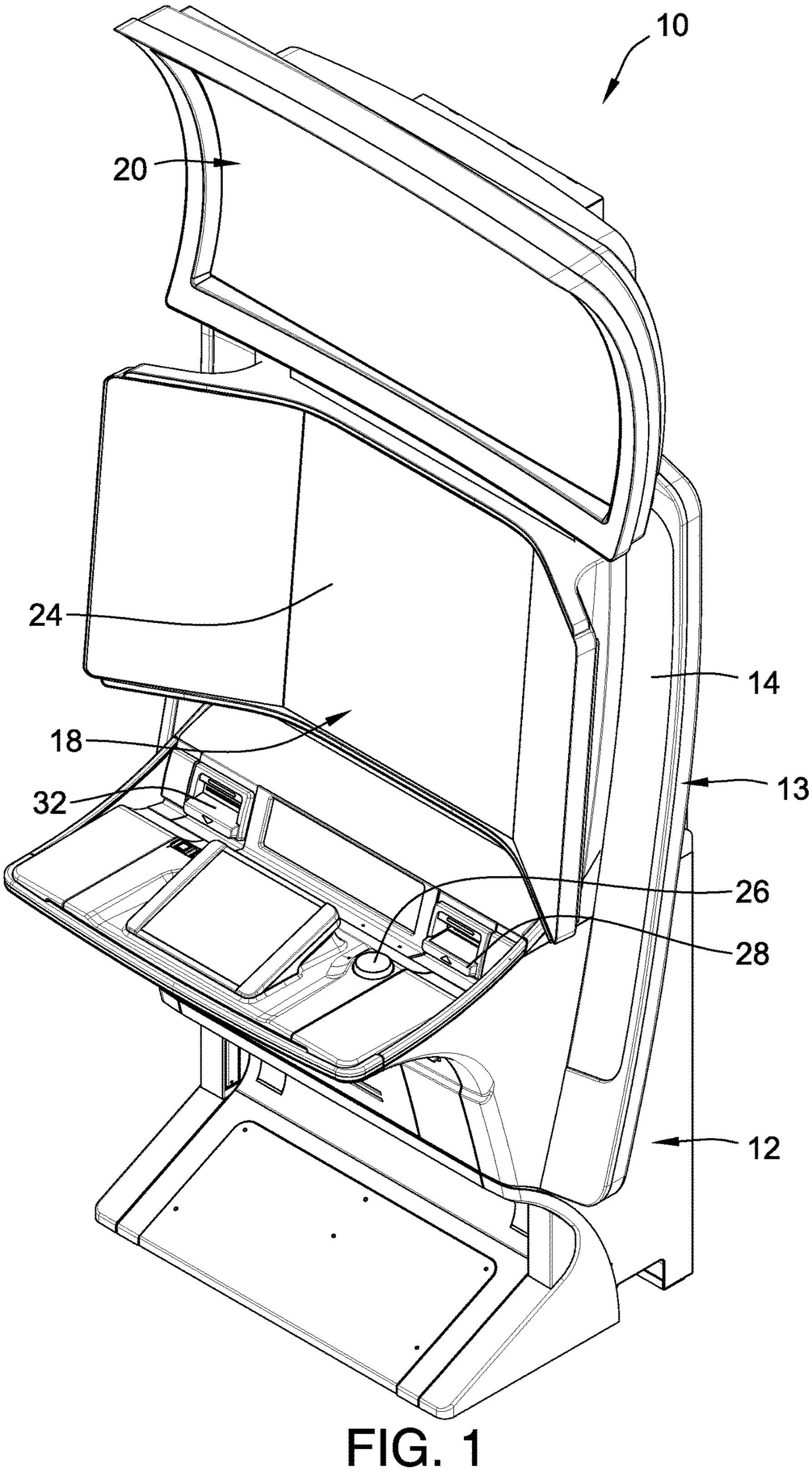
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill In some embodiments, the wagering game may be subject to approval for use in one of more regulated gaming jurisdictions. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 optionally forms an alcove configured to store one or more beverages or personal items of a player. A notification mechanism, such as a candle or tower light, is optionally mounted to the top of the cabinet 12. It flashes to alert an attendant that change is needed, a hand pay is requested, or there is a potential problem with the gaming machine 10. The gaming cabinet 12 optionally includes a rear wing 13 having a front surface 14 that is positioned rearward of a primary display 18.

The input devices, output devices, and input/output devices are disposed on, and securely coupled to, the cabinet 12. By way of example, the output devices include the primary display 18, a secondary display 20, and one or more audio speakers. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, one or more buttons 26 on a button panel and/or other player-input devices, a bill/ticket acceptor 28, a card reader/writer and/or ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit cash or credits onto the gaming machine 10. The cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. A value input device is configured to detect a physical item, such as coins, currency, cards, etc., associated with a monetary value that establishes a credit balance on a credit meter such as the "credits" meter 84 (see FIG. 3). In response to a cashout input that initiates a payout from the credit balance on the "credits" meter 84, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
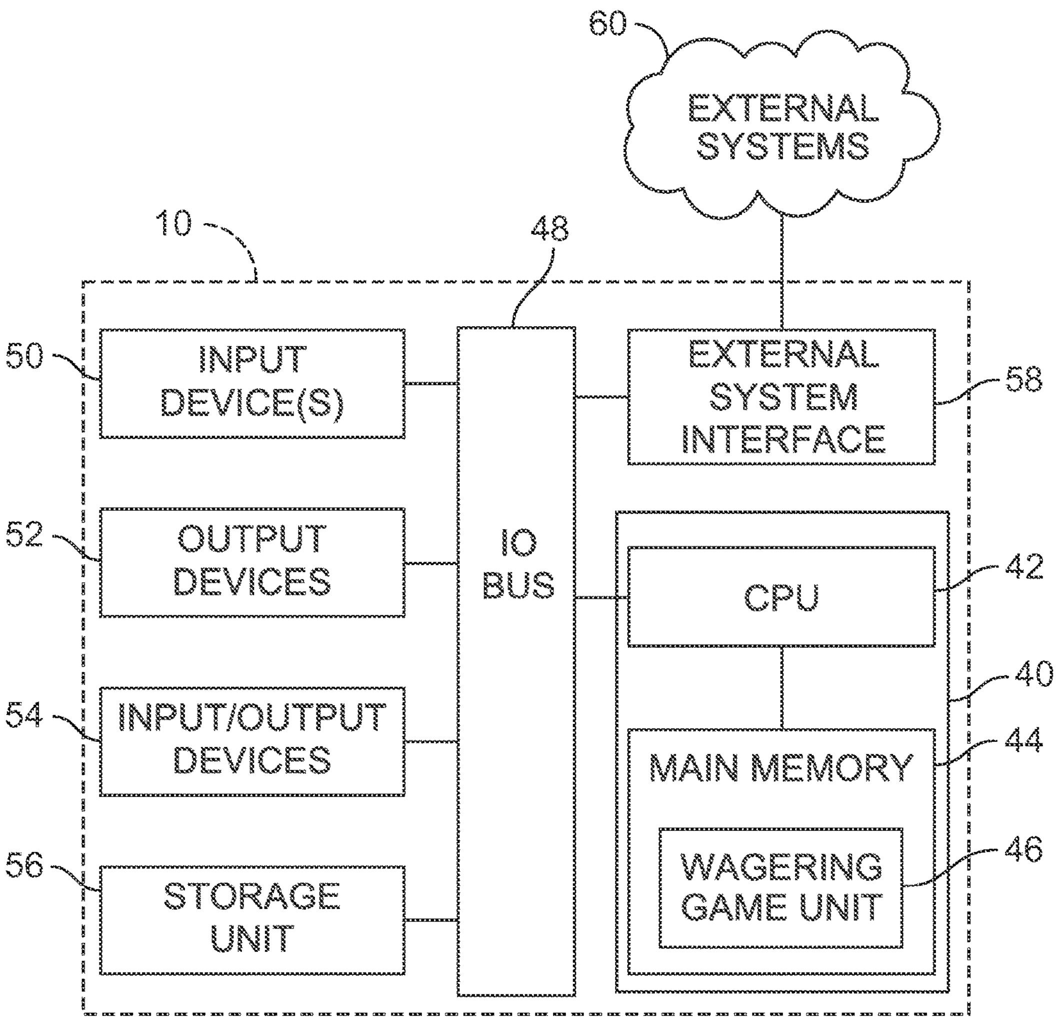
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game. For purposes of the present detailed description, the term "randomly determine" or "randomly select" is intended to include the use of either a pseudo-RNG or physical RNG in the determination of a value, outcome or element.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
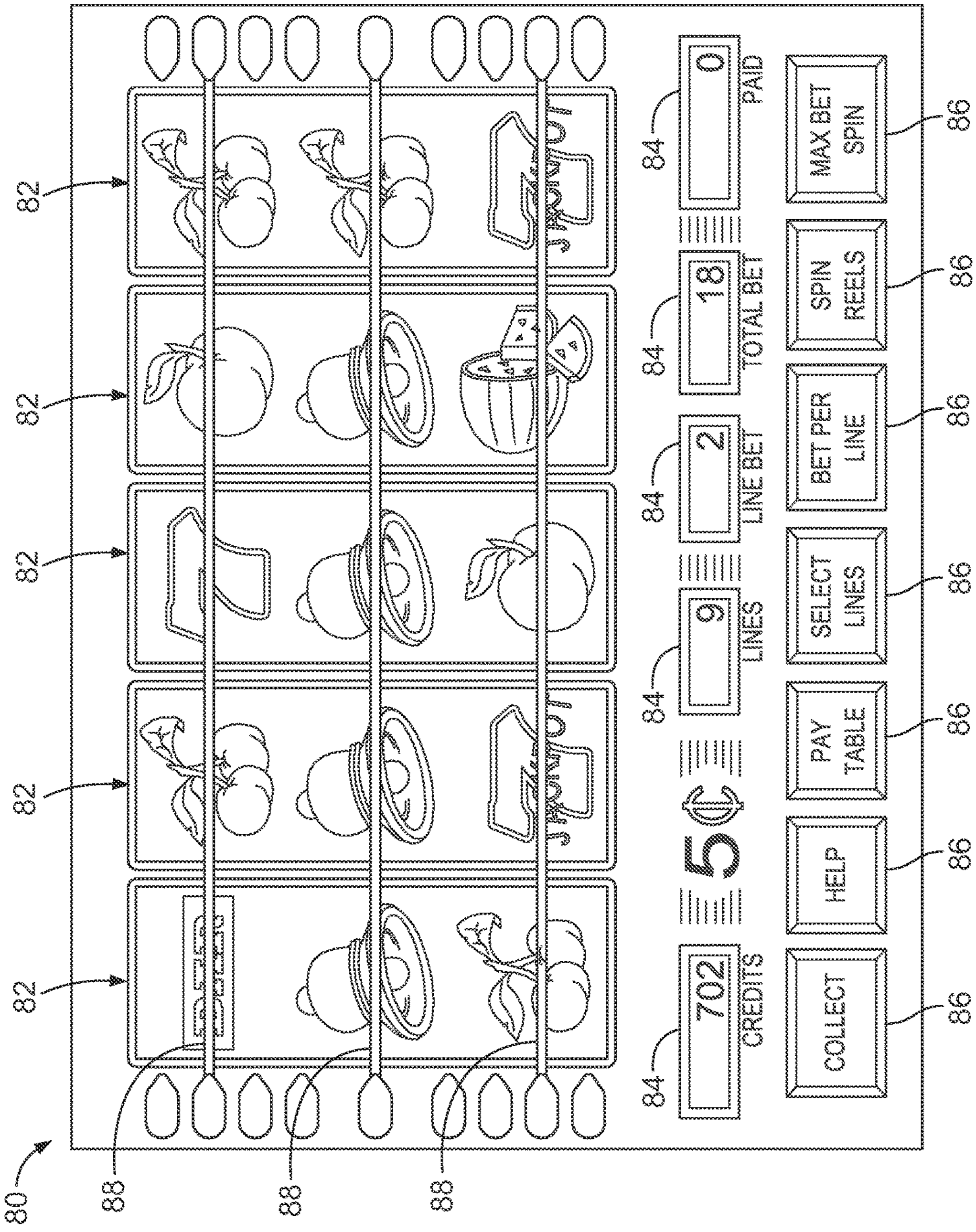
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4A:
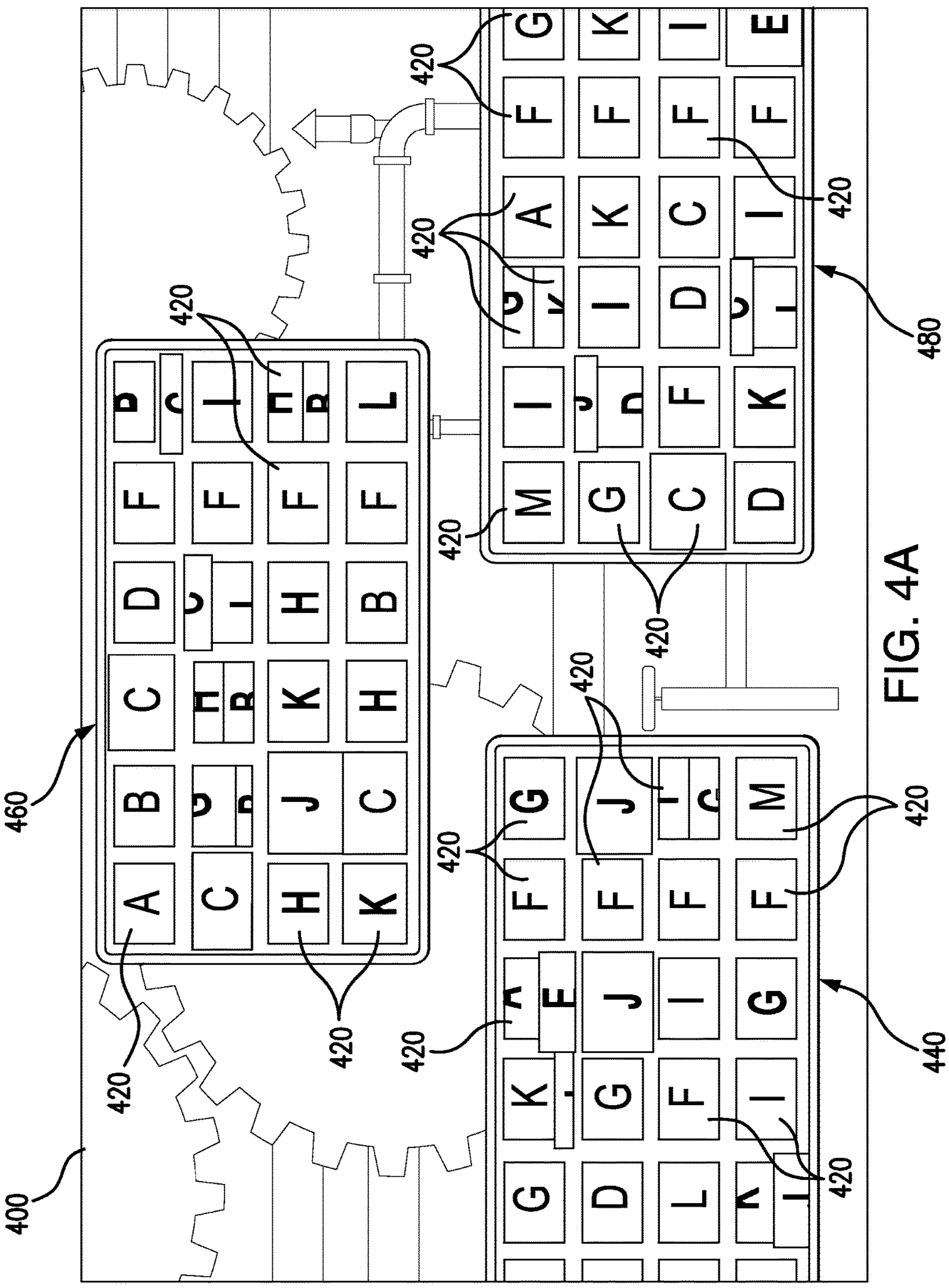
FIGS. 4A, 4B, 4C, 4D, 4E, 4F, 4G and 4H are a series of illustrations of an exemplary bonus-game screen of a wagering game displayed on a gaming machine, according to an embodiment of the present invention.

Referring now to FIG. 4A-4E, in accordance with one or more embodiments, a series of displays associated with the presentation of a bonus game, which may be triggered as described above, are illustrated. Referring to FIG. 4A, a bonus-game screen 400 portrays a plurality of game symbols 420 arranged in a plurality of adjoining matrices 440, 460 and 480 adapted to be displayed on the primary display 18 or the secondary display 20. The symbols 420 of matrices 440, 460 and 480 may be arranged for display, for example, by simulating the rotation and stopping of spinning reels bearing the game symbols 420. In one or more embodiments, matrices 440, 460 and 480 may be randomly populated without the use of simulated reels. For example, game symbols 420 may be randomly or pseudo-randomly selected and placed directly into the matrices 440, 460 and 480. In still other embodiments, a combination of simulated reels and other means for presenting the population of matrices 440, 460 and 480, such as direct placement, may be employed. In the exemplary illustration of FIG. 4A, each of matrices 440, 460 and 480 include twenty-four simulated symbol bearing reels which are animated to rotate in each cell of matrices 440, 460 and 480. In one or more embodiments, each column of matrices 440, 460 and 480 may be simulated as a reel bearing multiple game symbols 420.

Though not shown for the sake of simplicity, the bonus-game screen 400 also advantageously displays one or more game-session credit meters and various touch screen buttons adapted to be actuated by a player, as described above with respect to base-game screen 80. During presentation of the bonus game, a player can operate or interact with the wagering game using these touch screen buttons or other input devices such as the buttons 26 shown in FIG. 1. The game-logic circuitry 40 operates to execute the bonus game portion of the wagering-game program causing the primary display 18 or the secondary display 20 to display the bonus game, as further illustrated by FIGS. 4B-4E.

Figure 4B:
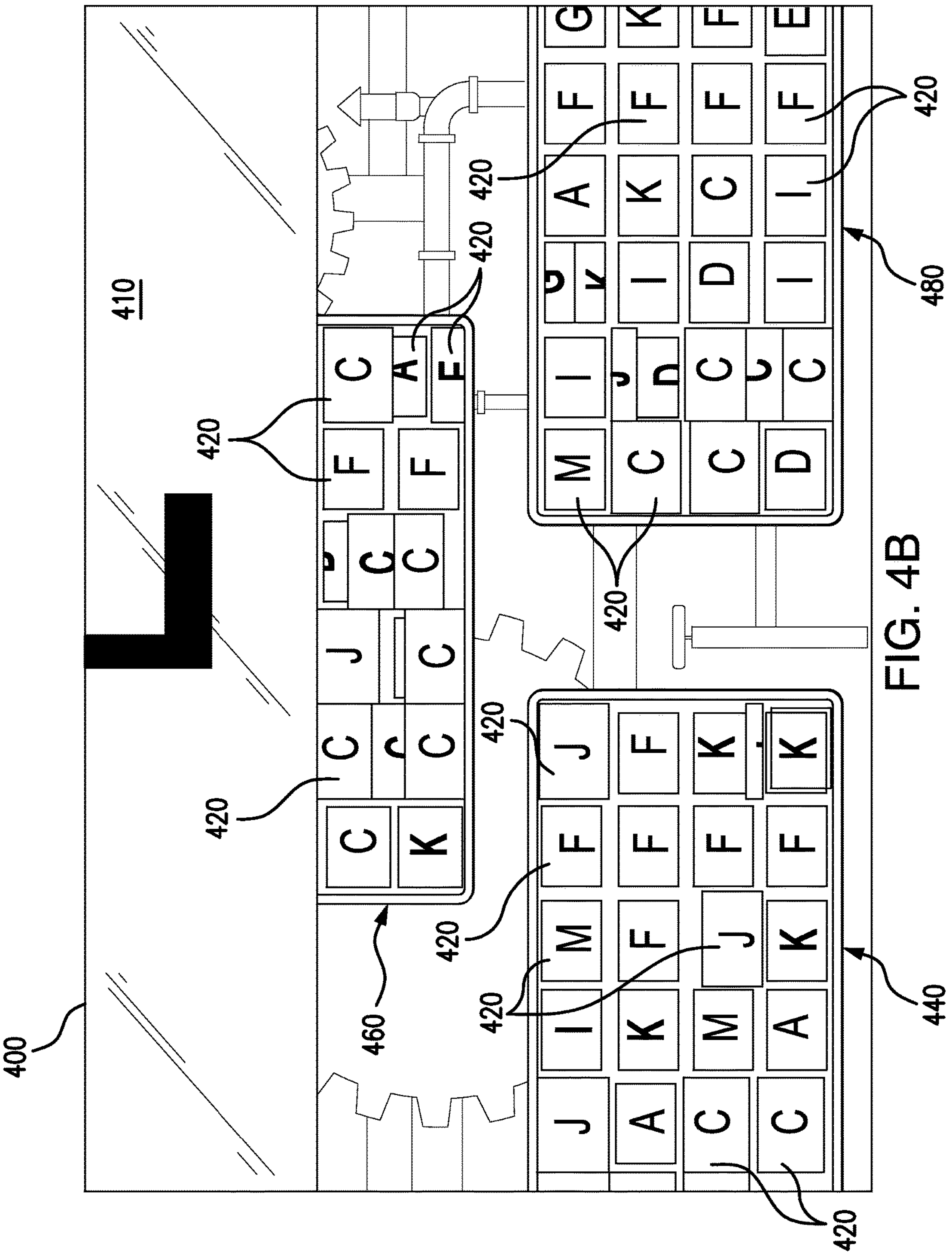

Referring now to FIG. 4B, in accordance with one or more embodiments, while the simulated reels of matrices 440, 460 and 480 are rotated, a modifier symbol 410, which may visually overlay at least one symbol 420 of matrix 440 and one symbol 420 of matrix 460, one symbol 420 of matrix 460 and one symbol 420 of matrix 480, one symbol 420 of matrix 440 and one symbol 420 of matrix 480, or any combinations thereof, may be animated to pass over two or more of matrices 440, 460 and 480. In accordance with one or more embodiments, the modifier symbol 410 may appear as being borne on a transparent "overlay" reel which rotates above the matrices 440, 460 and 480. In the example of FIG. 4B, modifier symbol 410 is presented on such a rotating reel and has just entered the top portion of the display, partially overlaying matrix 440. In the illustrated embodiment, modifier symbol 410 is large enough to potentially overlay all rows and columns of matrices 440, 460 and 480.

Figure 4C:
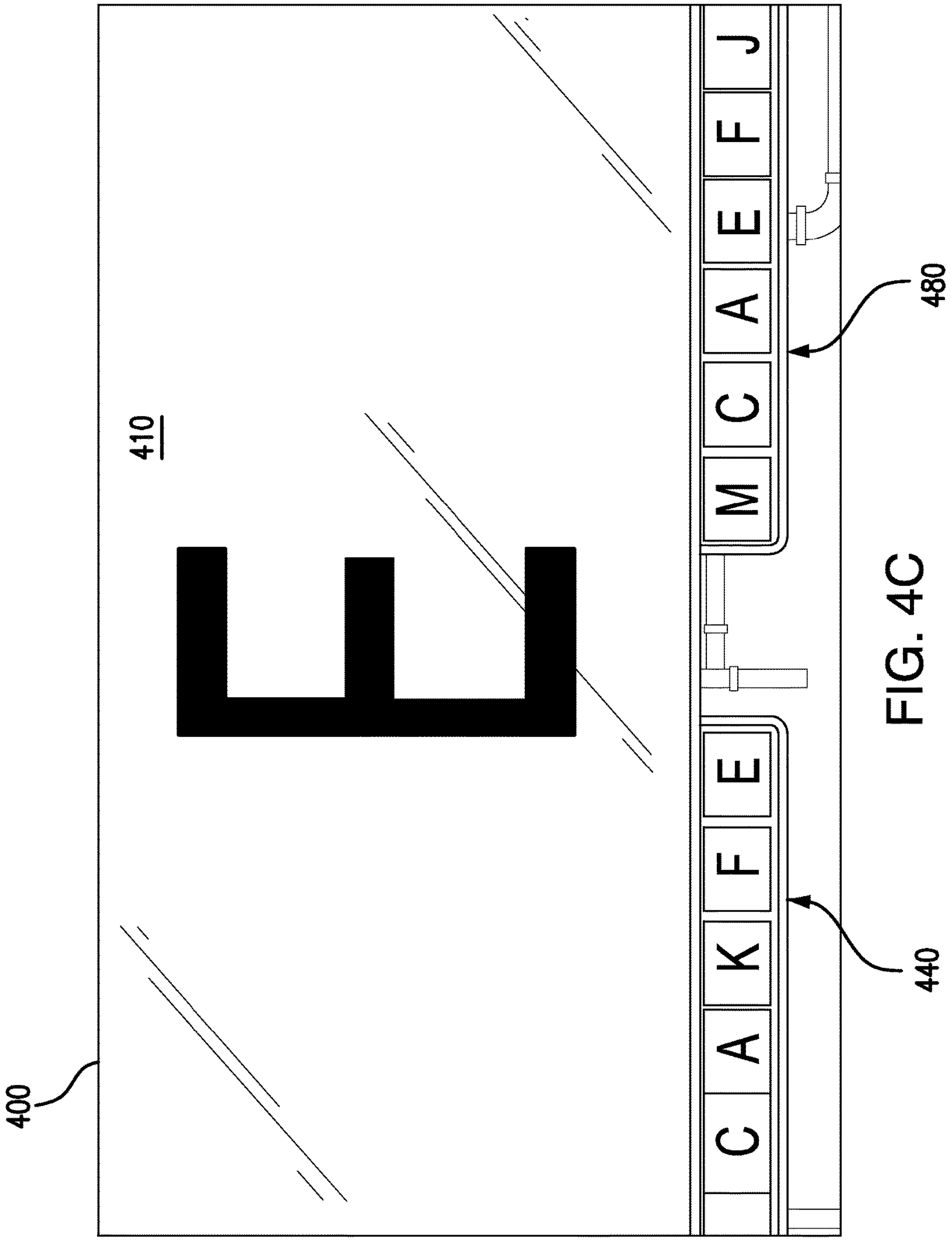

Referring now to FIG. 4C, in accordance with one or more embodiments, the "overlay reel" bearing modifier symbol 410 has stopped rotating, completely overlaying matrix 440 and overlaying all but the bottom rows of matrices 460 and 480. The modifier symbol 410 may stop rotating and reach its landing position before, after, or concurrently with the game symbols 420 landing in the matrices 440, 460 and 480. In a preferred embodiment, any game symbols 420 overlaid by the modifier symbol 410 do not land prior to being overlaid by the modifier symbol 410; rather, those game symbols 420 land concurrently with or after they are overlaid by the modifier symbol 410.

Figure 4D:
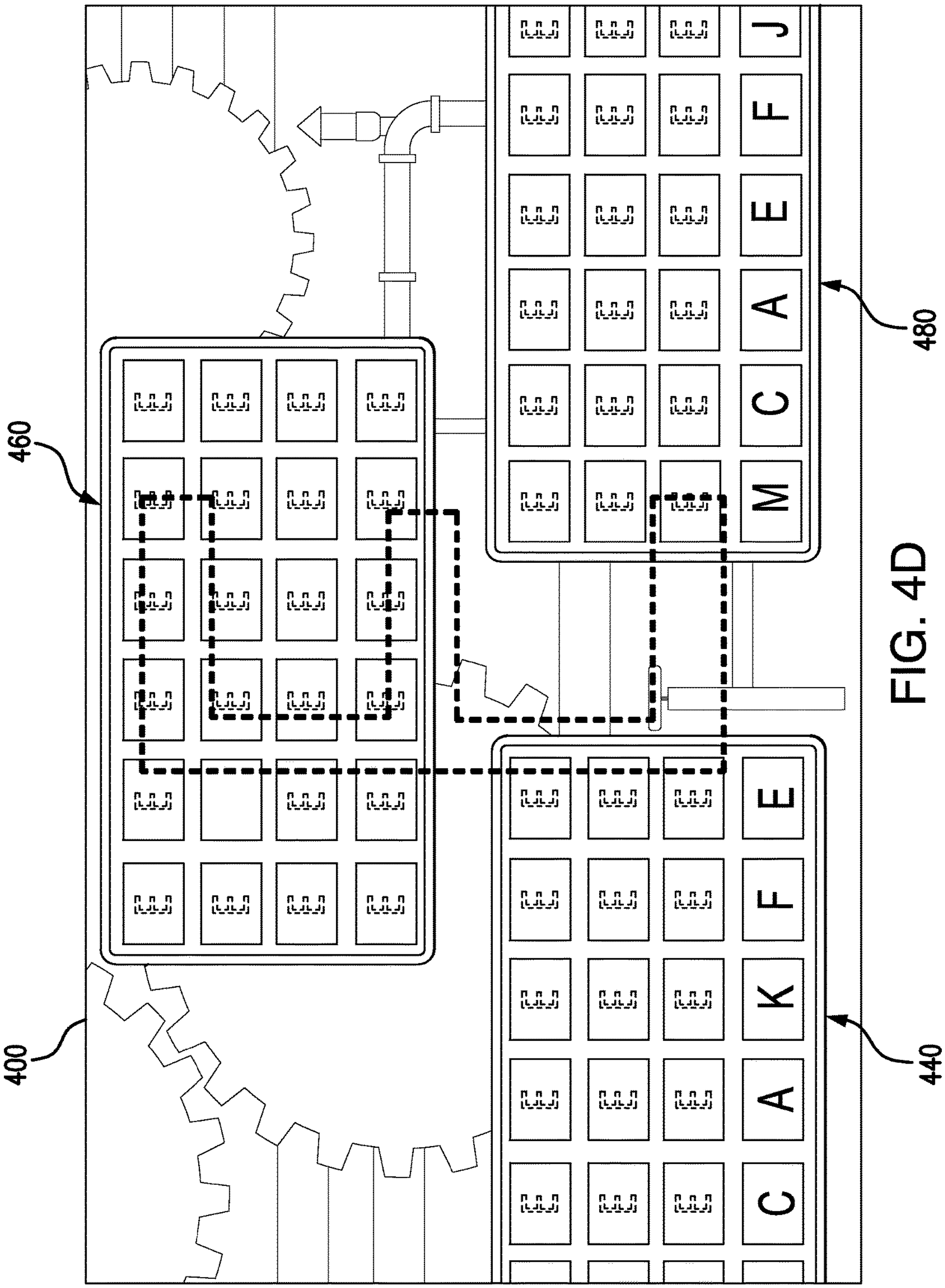

Referring now to FIG. 4D, in accordance with one or more embodiments, the "overlay reel" bearing modifier symbol 410 begins to "dissolve", partially revealing matrices 440, 460 and 480 in their entireties once again. Any manner of removing the overlaying modifier symbols 410 may be employed. In the illustration, the simulated reels of each of the matrices 440, 460 and 480 have also stopped rotating.

Figure 4E:
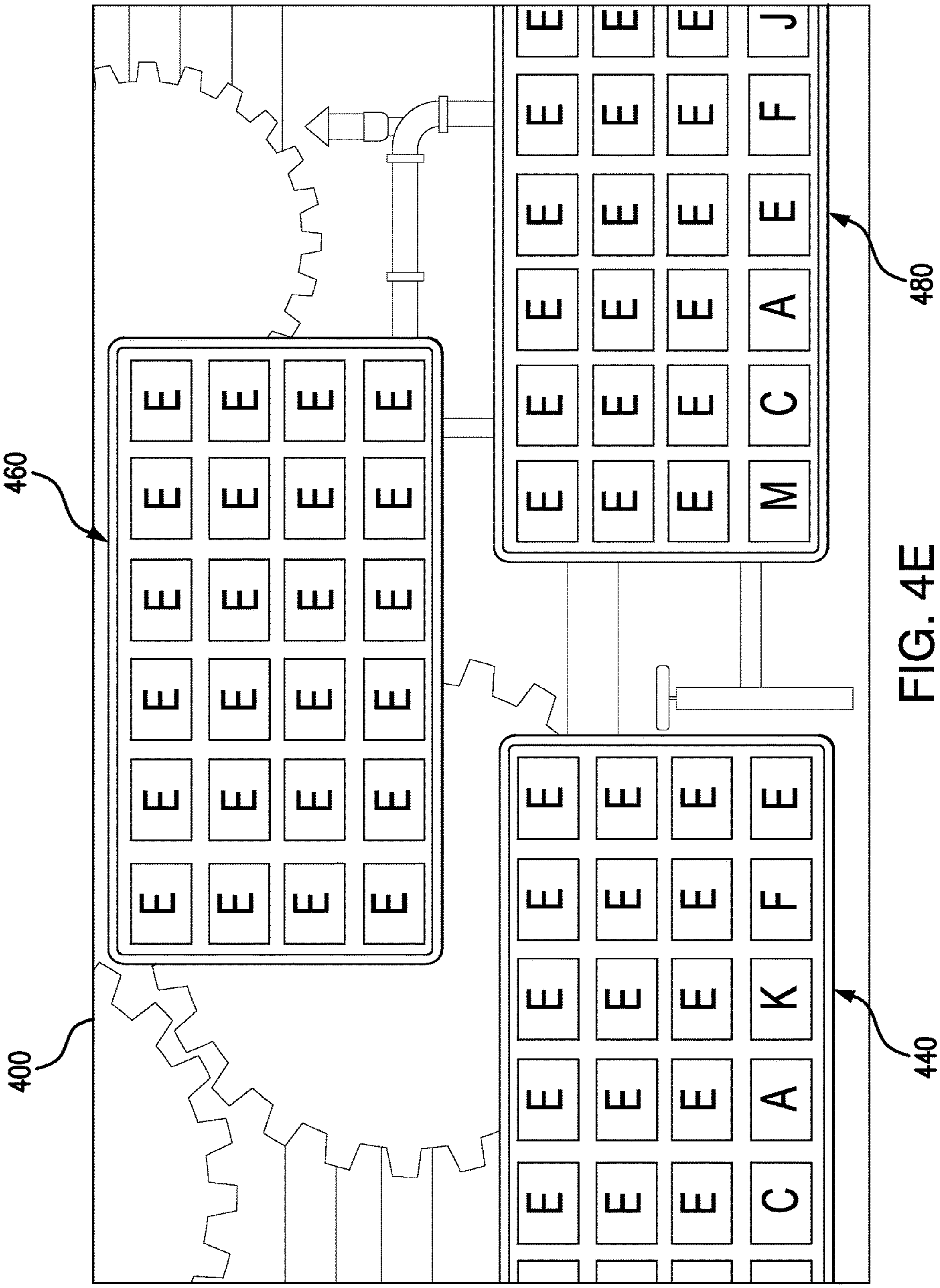

Referring now to FIG. 4E, in accordance with one or more embodiments, the "overlay reel" bearing modifier symbol 410 has completely "dissolved", fully revealing matrices 440, 460 and 480 in their entireties. All symbols 420 of matrices 440, 460 and 480 that were overlaid by modifier symbol 410 in its final resting position have been converted to individual copies of the modifier symbol. In accordance with other embodiments, the modification of the underlying symbols beneath modifier symbol 410 may vary. For example, each of the underlying symbols might become a "wild" symbol, jackpot symbol, or other high-paying symbol, or inherit some additional property, such as a multiplier value, from the temporarily overlaying modifier symbol to become a different symbol.

In one or more embodiments, the modifier symbol may be static, remaining the same from bonus game to bonus game. For example, the modifier symbol 410 may always be a "wild" symbol. In still other embodiments, modifier symbol 410 may be selected from a set of possible modifier symbols, such as, but not limited to, a "wild" symbol, a jackpot symbol, a high paying symbol, a multiplier symbol and the like.

As with the base game, once the underlying symbols have been modified, the bonus game evaluates the displayed symbols 420 in matrices 440, 460, and 480 and provides immediate awards and bonus features in accordance with predetermined award criteria such as a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may retrigger a bonus features based on one or more bonus triggering symbols appearing along an activated payline (i.e., "line trigger") or anywhere in the displayed array (i.e., "scatter trigger"). The bonus game may also provide mystery awards and features independent of the symbols appearing in the displayed array.

In some embodiments, the size of modifier symbol 410 may vary in height and/or width from bonus game to bonus game or from play to play within a bonus game. In other embodiments, the horizontal (left-right) positioning of modifier symbol 410 over the underlying matrices may be randomly determined or may be fixed from bonus game to bonus game or from play to play within a bonus game. For example, modifier symbol 410 may always overlay some or all of matrices 440, 460 and 480 or may overlay portions of matrices 440 and 460 in a first play of the bonus game and overlay portions of matrices 460 and 480 in a subsequent play of the bonus game.

A plurality of modifier symbols of same or different static or randomly-determined widths and/or heights are simultaneously employed in some embodiments. In some embodiments, the plurality of modifier symbols may appear to be borne on a single overlay reel. In other embodiments, each modifier symbol may appear to be borne on its own independent overlay reel. In one or more embodiments, the number of modifier symbols may be static, remaining the same from bonus game to bonus game, or randomly determined. In various other embodiments, the modifier symbols may be the static or selected from a set of possible modifier symbols, such as, but not limited to, a "wild" symbol, a jackpot symbol, a high paying symbol, a multiplier symbol and the like. For a given play, each of the plurality of modifier symbols may be the same or may be different from one another.

Figure 4F:
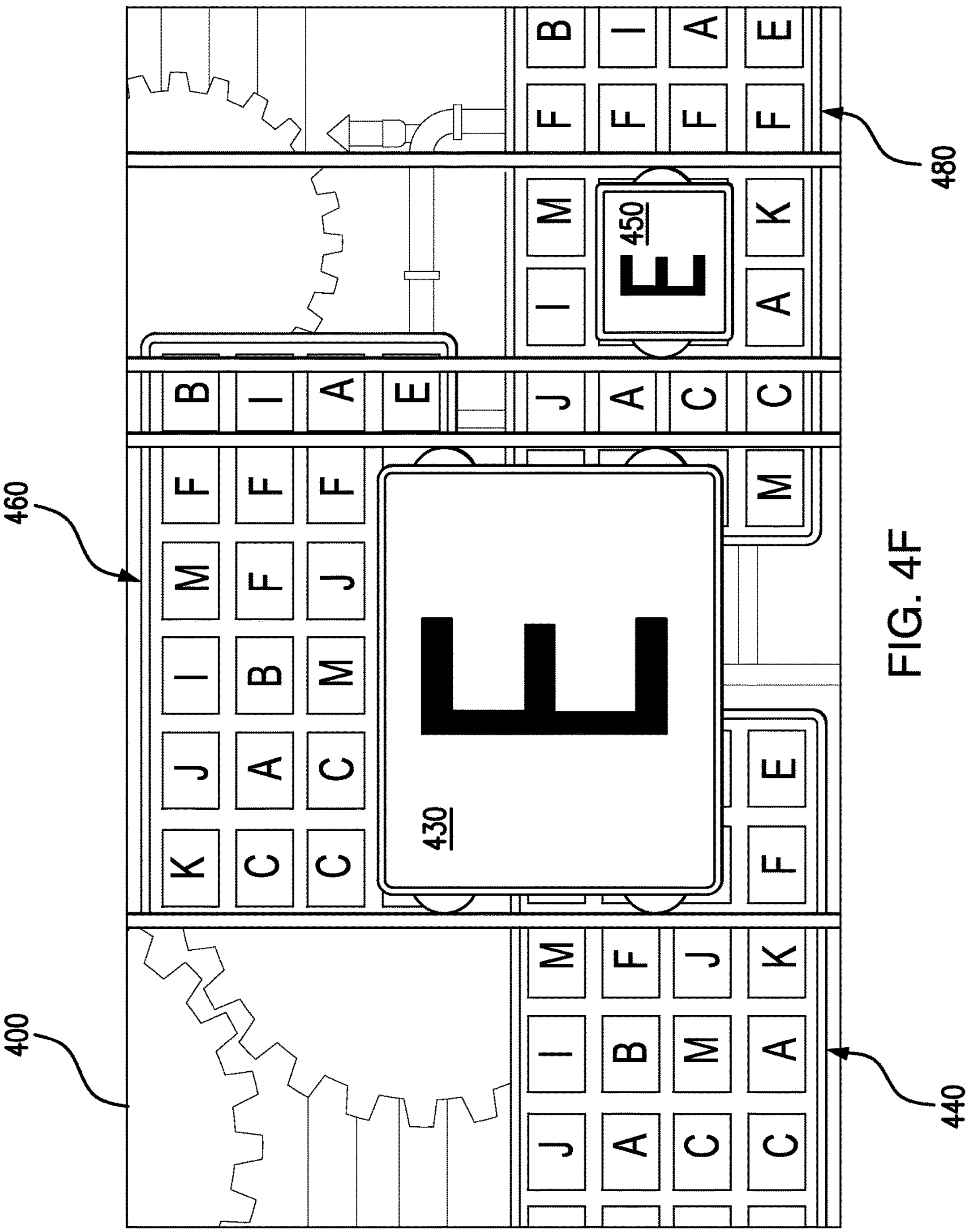
Figure 4G:
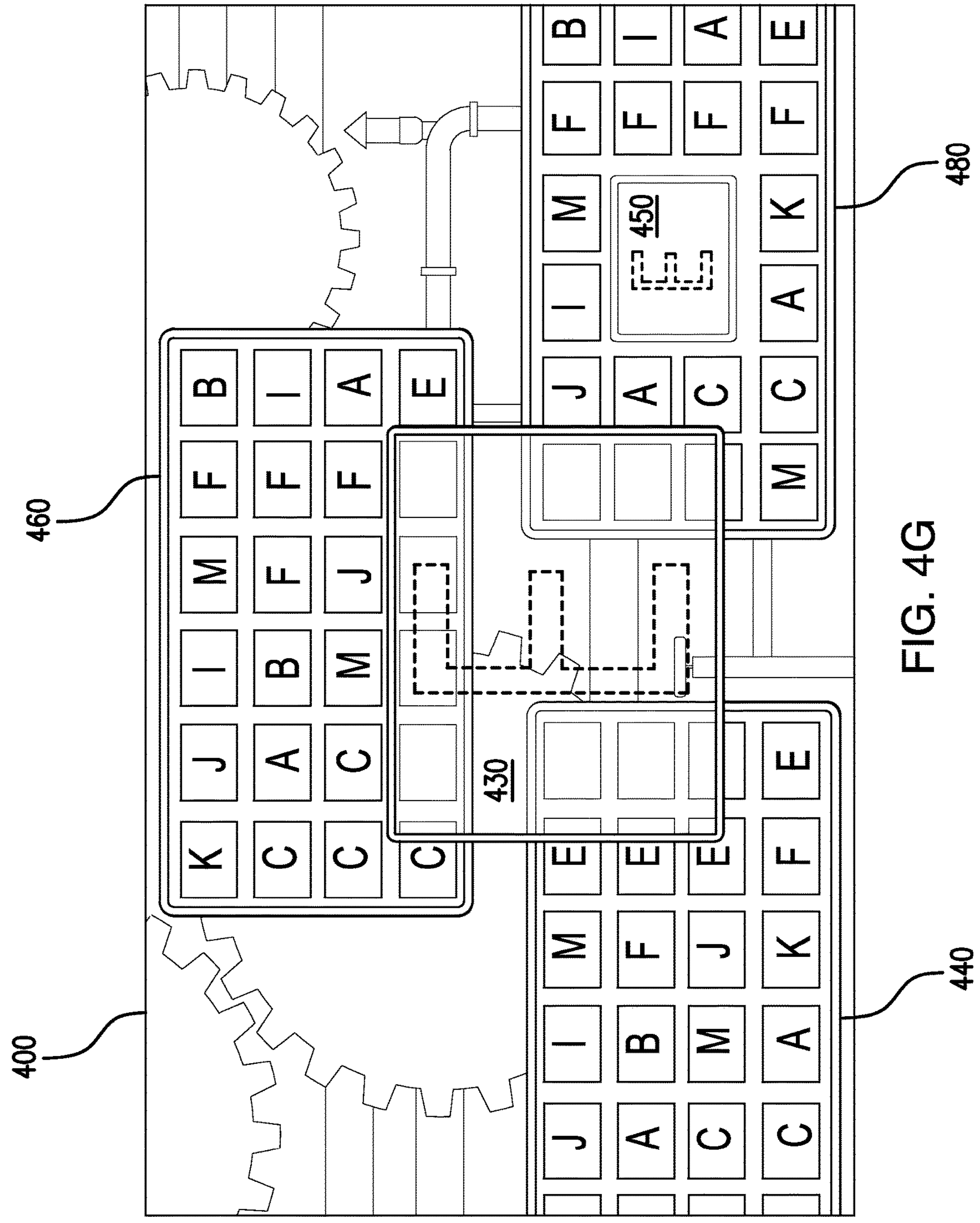
Figure 4H:
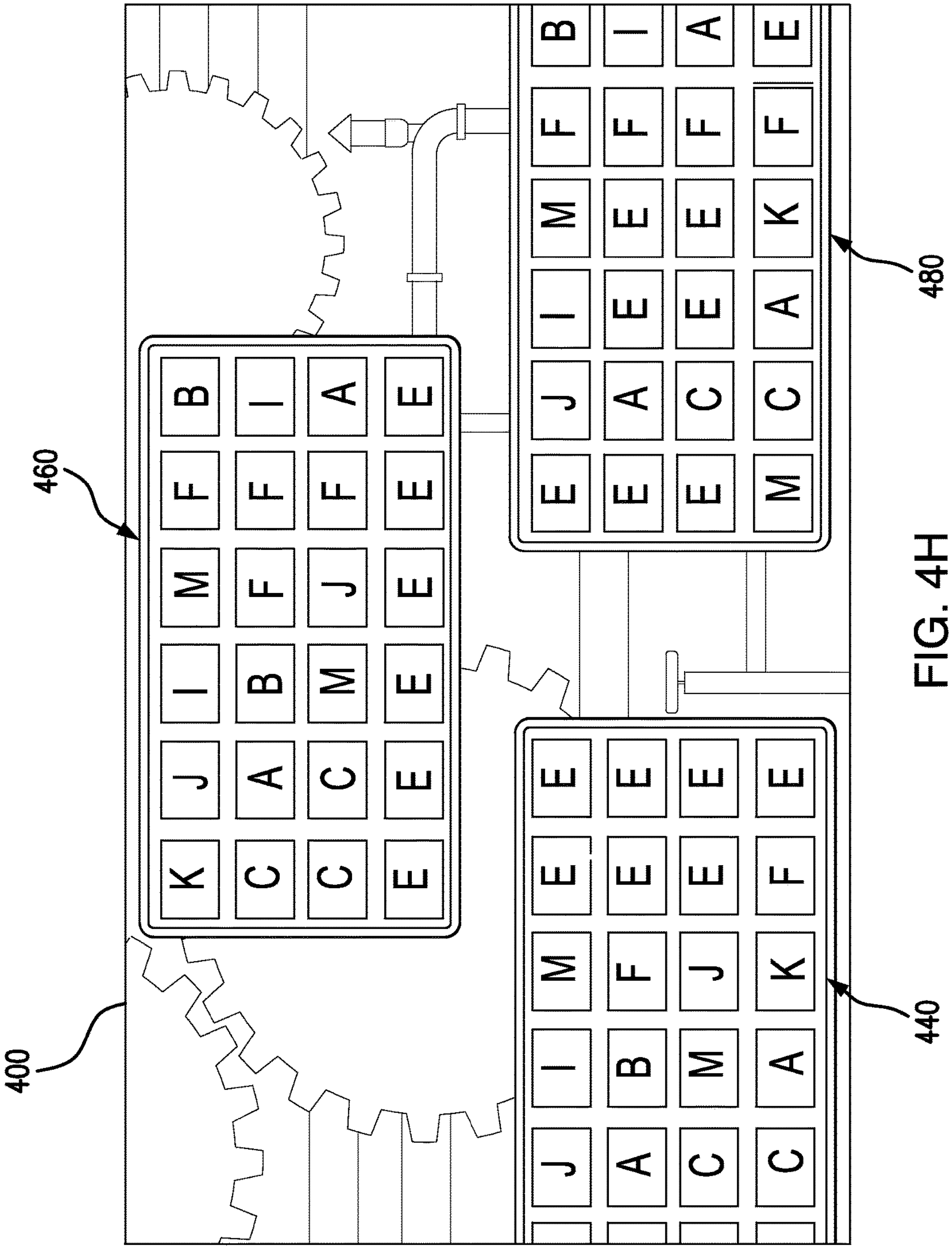

To illustrate, refer now to FIGS. 4F, 4G and 4H, in which an example of simultaneous overlaying modifier symbols in accordance with one or more embodiments is shown.

Referring to FIG. 4F, modifier symbols 430 and 450 are carried on independent overlay reels rotating over and partially overlaying matrices 440, 460 and 480. In this example, modifier symbol 430 has been randomly determined to be approximately five symbol-columns wide and four symbol-rows high, whereas modifier symbol 450 has been randomly determined to be approximately two symbol-columns wide and two symbol rows high. The horizontal positions of each of the overlay reels has also been randomly determined. In this example, only the final landing position of modifier symbol 430 may overlay portions of more than one matrix. Depending on where it lands, it is possible for modifier symbol 430 to overlay matrices 440, 460 and 480, only matrix 460, or portions of matrices 460 and 480, Based on its size and horizontal location, the final landing position of overlay symbol 450 can, at most, overlay portions of matrix 480 and may not overlay any matrix at all. Though not shown in this example, it should be understood that, depending on randomly-determined size and positioning, it may be possible that both overlay symbols 430 and 450 can overlay portions of multiple matrices on other plays of the bonus game. In this case, both modifier symbol 430 and modifier symbol 450 represent the same symbol.

Referring now to FIG. 4G, modifier symbols 430 and 450 have "landed" and the symbols are starting to "dissolve" to reveal matrices 440, 460 and 480 in their entireties. Any manner of removing the overlaying modifier symbols 430 and 450 may be employed.

Referring now to FIG. 4H, the "overlay reels" bearing modifier symbols 430 and 450 have completely "dissolved", fully revealing matrices 440, 460 and 480. All symbols 420 of matrices 440, 460 and 480 that were overlaid by modifier symbols 430 and 450 in their final landing positions have been converted to individual copies of the modifier symbol. Modifier symbol 430 landed to overlay portions of matrices 440, 460 and 480. Modifier symbol 450 landed to overlay a portion of matrix 480. As in the example of FIGS. 4A-4F, the modification of the underlying symbols beneath modifier symbols 430 and 450 may vary. As an example, each of the underlying symbols might become a "wild" symbol, jackpot symbol, or other high-paying symbol, or inherit some additional property, such as a multiplier value, from the temporarily overlaying modifier symbol to become a different symbol.

While the above examples are described within the context of a bonus game, it is equally contemplated that the invention can be practiced within the context of the basic wagering game.

Figure 5:
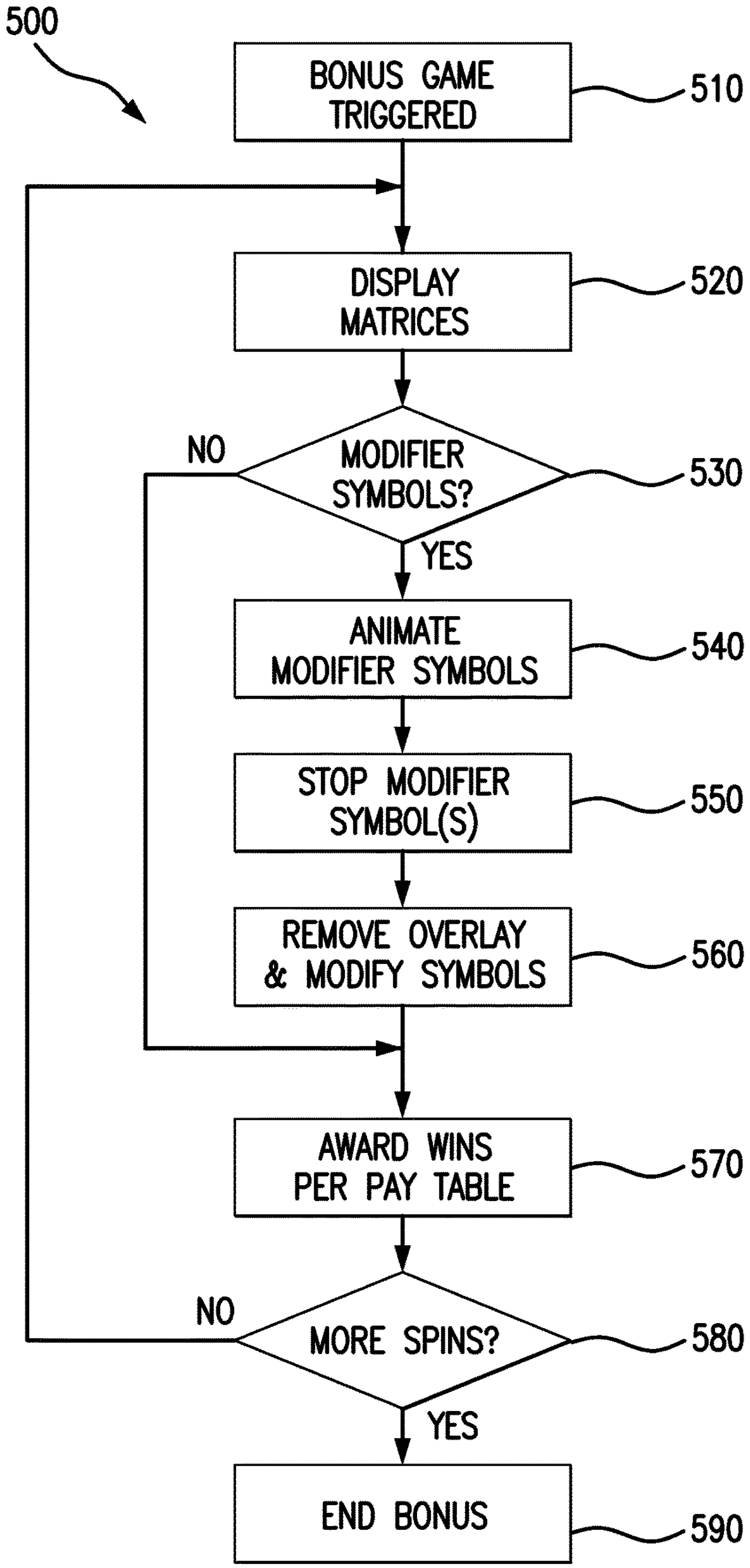
FIG. 5 is a flowchart for an algorithm that corresponds to instructions executed by a controller in accord with at least some aspects of the disclosed concepts.

FIG. 5, in accordance with one or more embodiments, represents one algorithm 500 that corresponds to at least some instructions stored and executed by the game-logic circuitry 40 in FIG. 2 to perform the above described functions associated with the disclosed concepts.

In block 510 of FIG. 5, a bonus game is triggered by the wagering game, which may, as previously described, trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in its displayed array. The bonus game may present one or more plays or "spins" to present a series of bonus game outcomes.

In block 520, a bonus-game screen portrays a plurality of game symbols arranged in a plurality of adjoining matrices on the primary display 18 or the secondary display 20. The symbols of the matrices may be arranged for display, for example, by simulating the rotation and stopping of spinning reels bearing the game symbols. In one or more embodiments, the matrices may be randomly populated without the use of simulated reels. For example, game symbols may be randomly or pseudo-randomly selected and placed directly into the matrices. In still other embodiments, a combination of simulated reels and other means for presenting the population of matrices, such as direct placement, may be employed.

In decision block 530, a determination is made whether this particular play of the bonus game will include one or more overlaying modifier symbols. If not, processing is directed to block 570, described below. If so, the overlaying modifier symbol(s) are animated at block 540. As described above, for example, the modifier symbol may appear to be borne on a transparent "overlay" reel which rotates above and overlays the adjoining matrices. In some embodiments, the number and sizes of the modifier symbols may vary from bonus game to bonus game or from play to play within a bonus game. In some embodiments, the modifier symbol is a static symbol. In still other embodiments, the modifier symbol is selected from a set of possible modifier symbols. After a period of presentation, the animation of the modifier symbol(s) is terminated at block 550, to present a stopped location for the modifier symbol(s).

At block 560, any modifier symbols are removed to reveal the portions of the underlying matrices which will be modified according to the modifier symbol(s). For example, all symbols of the adjoining matrices that were overlaid by a modifier symbol when it comes to rest may be converted to individual copies of the modifier symbol. In accordance with other embodiments, the modification of the underlying symbols beneath a modifier symbol may vary. For example, each of the underlying symbols may become a "wild" symbol, jackpot symbol, or other high-paying symbol, or inherit some additional property from the temporarily overlaying modifier symbol such as a multiplier value.

At block 570, once the final composition of each of the matrices has been determined, the bonus game evaluates the displayed symbols in the matrices and awards immediate awards and bonus features in accordance with predetermined award criteria such as a pay table, as previously described.

At decision block 580, a determination is made whether additional bonus game plays or "spins" are to be played. If so, control returns to block 520, otherwise, the bonus game ends at block 590.

The order of actions as shown in FIG. 5 is only illustrative, and should not be considered limiting. For example, the order of the actions may be changed, additional steps may be added or some steps may be removed without deviating from the scope and spirit of the invention. In a further example, while the above algorithm is described within the context of a bonus game, it is equally contemplated that the invention can be practiced within the context of the basic wagering game.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A gaming system, comprising:

a regulated gaming machine primarily dedicated for use in playing at least one regulated casino wagering game, the gaming machine including an electronic display device and a value input device; and game-logic circuitry configured to:

detect, via the value input device, a physical item associated with a monetary value that establishes a credit balance;

receive an input indicative of a wager covered by the credit balance;

randomly select an outcome of the casino wagering game;

direct the electronic display device to display the selected outcome via first and second non-contiguous matrices each comprising a plurality of game symbols and via a modifier symbol displayed in a position to temporarily overlay at least one symbol in each of the first and second matrices and to convert any overlaid symbols to another symbol, the first and second matrices comprising respective first and second sets of adjacent columns, the first and second matrices being visually spaced from each other such that (i) adjacent ones of the columns in the first set are visually closer to each other than to the second set of columns and (ii) adjacent ones of the columns in the second set are visually closer to each other than to the first set of columns; and award an award in response to the displayed outcome meeting predetermined award criteria, the predetermined award criteria being set forth in first and second pay tables, the first pay table being applicable to the first matrix independent from the second matrix, the second pay table being applicable to the second matrix independent from the first matrix.

2. The gaming system of claim 1 further comprising a third non-contiguous matrix, wherein the modifier symbol temporarily overlays at least one symbol in each of the first, second and third matrices and converts any overlaid symbols to another symbol.

3. The gaming system of claim 1 wherein the modifier symbol is randomly positioned horizontally over the first and second matrices.

4. The gaming system of claim 1 wherein the modifier symbol converts each overlaid symbol to the modifier symbol.

5. The gaming system of claim 1 wherein the modifier symbol converts each overlaid symbol to a symbol other than the modifier symbol.

6. The gaming system of claim 1 further comprising a second modifier symbol displayed in a position to temporarily overlay at least one symbol in each of the first and second matrices and to convert any overlaid symbols to another symbol.

7. The gaming system of claim 1 wherein the size of the modifier symbol is randomly determined.

8. The gaming system of claim 1 wherein the first pay table includes first paying symbol combinations in the first matrix independent from any symbol combinations in the second matrix, and the second pay table includes second paying symbol combinations in the second matrix independent from any symbol combinations in the first matrix.

9. The gaming system of claim 8 wherein the first paying symbol combinations include at least one of first line pays or first scatter pays, and the second paying symbol combinations include at least one of second line pays or second scatter pays.

10. A regulated casino gaming machine primarily dedicated to playing at least one casino wagering game, comprising:

an electronic display device;

a value input device; and game-logic circuitry configured to:

detect, via the value input device, a physical item associated with a monetary value that establishes a credit balance;

receive an input indicative of a wager covered by the credit balance;

randomly select an outcome of the casino wagering game;

direct the electronic display device to display the selected outcome via first and second non-contiguous matrices comprising a plurality of game symbols and via a modifier symbol displayed in a position to temporarily overlay at least one symbol in each of the first and second matrices and to convert any overlaid symbols to another symbol, the first and second matrices comprising respective first and second sets of adjacent columns, the first and second matrices being visually spaced from each other such that (i) adjacent ones of the columns in the first set are visually closer to each other than to the second set of columns and (ii) adjacent ones of the columns in the second set are visually closer to each other than to the first set of columns; and award an award in response to the displayed outcome meeting predetermined award criteria, the predetermined award criteria being set forth in first and second pay tables, the first pay table being applicable to the first matrix independent from the second matrix, the second pay table being applicable to the second matrix independent from the first matrix.

11. The gaming system of claim 10 further comprising a third non-contiguous matrix, wherein the modifier symbol temporarily overlays at least one symbol in each of the first, second and third matrices and converts any overlaid symbols to another symbol.

12. The gaming system of claim 10 wherein the modifier symbol is randomly positioned horizontally over the first and second matrices.

13. The gaming system of claim 10 wherein the modifier symbol converts each overlaid symbol to the modifier symbol.

14. The gaming system of claim 10 wherein the modifier symbol converts each overlaid symbol to a symbol other than the modifier symbol.

15. The gaming system of claim 10 further comprising a second modifier symbol displayed in a position to temporarily overlay at least one symbol in each of the first and second matrices and to convert any overlaid symbols to another symbol.

16. The gaming system of claim 10 wherein the size of the modifier symbol is randomly determined.

17. A method of operating a gaming system, the gaming system including game-logic circuitry and a regulated gaming machine, the gaming machine primarily dedicated to playing at least one casino wagering game, the gaming machine including an electronic display device and a value input device, the method comprising:

detecting, via the value input device, a physical item associated with a monetary value that establishes a credit balance;

receiving an input indicative of a wager covered by the credit balance;

randomly selecting an outcome of the casino wagering game;

directing the electronic display device to display the selected outcome via first and second non-contiguous matrices comprising a plurality of game symbols and via a modifier symbol displayed in a position to temporarily overlay at least one symbol in each of the first and second matrices and to convert any overlaid symbols to another symbol, the first and second matrices comprising respective first and second sets of adjacent columns, the first and second matrices being visually spaced from each other such that (i) adjacent ones of the columns in the first set are visually closer to each other than to the second set of columns and (ii) adjacent ones of the columns in the second set are visually closer to each other than to the first set of columns;

award an award in response to the displayed outcome meeting predetermined award criteria, the predetermined award criteria being set forth in first and second pay tables, the first pay table being applicable to the first matrix independent from the second matrix, the second pay table being applicable to the second matrix independent from the first matrix; and receiving, via at least one of the one or more electronic input devices, a cashout input that initiates a payout from the credit balance.

18. The method of claim 17 further comprising a third non-contiguous matrix, wherein the modifier symbol temporarily overlays at least one symbol in each of the first, second and third matrices and converts any overlaid symbols to another symbol.

19. The method of claim 17 wherein the modifier symbol is randomly positioned horizontally over the first and second matrices.

20. The method of claim 17 wherein the modifier symbol converts each overlaid symbol to the modifier symbol.

21. The method of claim 17 wherein the modifier symbol converts each overlaid symbol to a symbol other than the modifier symbol.

22. The method of claim 17 wherein the size of the modifier symbol is randomly determined.

* * * * *